United States Patent
Inoue et al.

(10) Patent No.: US 7,574,087 B2
(45) Date of Patent: Aug. 11, 2009

(54) OPTICAL FIBER

(75) Inventors: Dai Inoue, Gunma (JP); Hiroshi Oyamada, Gunma (JP); Yuichi Morishita, Kawasaki (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 11/790,833

(22) Filed: Apr. 27, 2007

(65) Prior Publication Data
US 2007/0196062 A1 Aug. 23, 2007

Related U.S. Application Data

(63) Continuation of application No. PCT/JP2005/019314, filed on Oct. 20, 2005.

(30) Foreign Application Priority Data

| Oct. 29, 2004 | (JP) | ............................ 2004-316796 |
| Feb. 24, 2005 | (JP) | ............................ 2005-048792 |

(51) Int. Cl.
G02B 6/02 (2006.01)
(52) U.S. Cl. ..................................... 385/123
(58) Field of Classification Search ................. 385/127, 385/123
See application file for complete search history.

(56) References Cited

U.S. PATENT DOCUMENTS

| 6,542,683 B1 | 4/2003 | Evans et al. | |
| 6,952,519 B2 * | 10/2005 | Bickham et al. | 385/127 |
| 2002/0197005 A1 * | 12/2002 | Chang et al. | 385/24 |
| 2003/0099455 A1 * | 5/2003 | Zhang et al. | 385/142 |
| 2004/0028363 A1 * | 2/2004 | Tanigawa et al. | 385/123 |
| 2004/0136668 A1 * | 7/2004 | Takahashi et al. | 385/123 |

FOREIGN PATENT DOCUMENTS

| CN | 1391657 A | 1/2003 |
| JP | 4-367539 | 12/1992 |
| JP | 5-249329 | 9/1993 |
| JP | 9-301738 | 11/1997 |
| JP | 10-96828 | 4/1998 |
| JP | 2002-202428 | 7/2002 |
| JP | 2002-533774 | 10/2002 |
| JP | 2003-515755 | 5/2003 |

* cited by examiner

*Primary Examiner*—Jerry T Rahll
(74) *Attorney, Agent, or Firm*—McGinn IP Law Group, PLLC

(57) ABSTRACT

An optical fiber includes a clad portion and a core portion surrounded by the clad portion. Here, the clad portion is formed by substantially pure quartz, and the core portion has a higher refractive index than the clad portion. The optical fiber is characterized in that a relative refractive index difference of a center of the core portion falls within a range from 0.15% to 0.30%, and a maximum relative refractive index difference of the core portion falls within a range from 0.4% to 0.6%. Here, it is preferable that an average relative refractive index difference of the core portion falls within a range from 0.30% to 0.40%. Here, a mode field diameter of the optical fiber falls within a range from 8.6 μm to 9.5 μm at 1310 nm, and a cable cutoff wavelength of the optical fiber is equal to or lower than 1260 nm. Note that, after the optical fiber is subjected to hydrogen aging, a loss of the optical fiber is preferably equal to or lower than 0.4 dB/km at 1383 nm.

17 Claims, 4 Drawing Sheets

REFRACTIVE INDEX DISTRIBUTION RELATING TO PRESENT INVENTION
(CORE ROD)

OPTICAL FIBER

CROSS REFERENCE TO RELATED APPLICATION

This is a continuation application of PCT/JP2005/019314 filed on Oct. 20, 2005 which claims priority from Japanese Patent Applications No. 2004-316796 filed on Oct. 29, 2004 and No. 2005-048792 filed on Feb. 24, 2005, the contents of which are incorporated herein by reference.

BACKGROUND

1. Technical Field

The present invention relates to an optical fiber for use in the field of optical communication applications which input, into the optical fiber, signal light having a relatively high optical energy.

2. Related Art

According to applications such as passive optical network (PON) systems, signals are transmitted via a single optical fiber to a location near subscribers and split at the location appropriately in accordance with the number of the subscribers. When this technique is utilized, the further the splitting location is positioned from the base station, or the larger the number of the subscribers is, the higher optical energy the base station needs to input into the optical fiber.

Recent development of amplifiers such as erbium doped fiber amplifiers (EDFAs) has increasingly enabled high optical energy to be input into the optical fiber. Generally speaking, however, when signal light having a high energy is input into an optical fiber, a phenomenon called stimulated Brillouin scattering (SBS) occurs. This phenomenon reduces the amount of optical energy that is actually transmitted. As mentioned, for example, in the non-Patent Document 1, a threshold value (mW) of the optical energy to cause the SBS is proportional to the effective cross-section ($A_e$) of the optical fiber, and inversely proportional to the Brilliouin gain coefficient $g_B$ and effective interacting length ($L_e$).

Here, the SBS occurs in the following manner. A periodic density distribution is formed within the optical fiber due to acoustic phonons, and functions as gratings, to scatter the signal light. Since the acoustic phonons also move, the scattered light has a frequency slightly lower than the original signal light because of the Doppler effect. The interference between the scattered light and signal light further excites the acoustic phonons, thereby increasing the scattering intensity.

When the signal light has an intensity equal to or lower than the threshold value to cause the SBS, the scattering has little influence on the signal light. However, when the intensity of the signal light exceeds the threshold value, the scattering intensity radically increases. Once the intensity of the signal light reaches a certain level, the increase in the intensity of the signal light input into the optical fiber only raises the scattered light, and does not enhance the intensity of the actually transmitted signal. On the contrary, such an increase raises noise, thereby degrading the signal.

In view of the above, a variety of methods have been proposed to raise the threshold value to cause the SBS.

Here, the spectrum of the scattered light differs depending on the composition of the materials and distortion of the optical fiber used. It has been found that the broader the spectrum of the scattered light is, the higher the threshold value to cause the SBS becomes. According to Patent Document 1, for example, a method is disclosed to raise the threshold value to cause the SBS by varying the diameter of the core, the refractive index and distortion in the longitudinal direction of the optical fiber. Patent Document 2 discloses a method to raise the threshold value to cause the SBS by varying the density of the dopant such as fluorine in the longitudinal direction of the optical fiber in the step of forming part of the core and clad portions when a preform for an optical fiber is manufactured by using a two-step method. Patent Document 3 discloses a similar method of varying the dopant density in the longitudinal direction. Patent Document 4 discloses a method to simultaneously vary both the diameter of the core and the relative refractive index difference in the longitudinal direction. According to all of the methods mentioned above, the values of one or more parameters are varied in the longitudinal direction of the optical fiber.

In addition to the above-mentioned methods, Patent Document 5 discloses the following method. A plurality of annular regions are formed in the vicinity of the boundary between the core and clad portions. The annular regions each have a small thickness, and are uniform in the longitudinal direction. In each of the annular regions, a dopant having a different coefficient of thermal expansion (CTE) and a different viscosity is doped. The annular regions are adjusted so as not to affect the transmission characteristics which are determined by the refractive index distribution. In this manner, a distortion distribution is formed in the radial direction in the optical fiber, in order to reduce the SBS.

Non-Patent Document 1: "Optical Fiber Telecommunications IIIA", Academic Press, page 200

Patent Document 1: Japanese Patent No. 2584151

Patent Document 2: Japanese Patent No. 2753426

Patent Document 3: Unexamined Japanese Patent Application Publication No. H09-301738

Patent Document 4: Unexamined Japanese Patent Application Publication No. H10-96828

Patent Document 5: U.S. Pat. No. 6,542,683

When a method of varying one or more characteristic parameters of an optical fiber in the longitudinal direction of the optical fiber is used, remarkable effects can be obtained by varying the parameters in short intervals of equal to or shorter than approximately 1 km. However, low-cost methods of manufacturing optical fibers based on large preforms have difficulties in varying the parameters in such short intervals, considering that the drawing rate is as high as 1 km/min or higher and, when a large preform is used, a preform having a length of as short as approximately 1.5 mm to 5 mm is sufficient to manufacture an optical fiber of 1 km by drawing.

On the other hand, the method in which thin annular regions are formed so as to be arranged in the radial direction of the optical fiber by using a plurality of dopants is very difficult to be practiced because the dopants disperse in the radial direction during the manufacturing process of the optical fiber. In addition, an optical fiber manufactured by using this method suffers from a larger loss than a normal optical fiber, and has a small value for $L_e$. Therefore, this method has difficulties in achieving desired effects. The optical fiber manufactured by means of this method poses another drawback that an even higher optical energy needs to be input.

An advantage of some embodiments of the present invention is to provide an optical fiber which can be manufactured at low costs, has a higher threshold value to cause the SBS, and enables signal light having a high energy to be input. This object is achieved by combining the features recited in the independent claims. The dependent claims define further effective specific example of the present invention.

SUMMARY

An optical fiber relating to the present invention includes a clad portion and a core portion surrounded by the clad portion. Here, the clad portion is formed by substantially pure quartz, and the core portion has a higher refractive index than the clad portion. The optical fiber relating to the present invention is characterized in that a relative refractive index difference of a center of the core portion falls within a range from 0.15% to 0.30%, and a maximum relative refractive index difference of the core portion falls within a range from 0.4% to 0.6%. Having such a unique refractive index distribution, the optical fiber achieves a high threshold value to cause the SBS.

It should be noted that when the relative refractive index difference of the center of the core portion is lower than 0.15%, or when the maximum relative refractive index difference of the core portion is higher than 0.6%, the optical fiber is difficult to be manufactured. When the relative refractive index difference of the center of the core portion is higher than 0.30 %, or when the maximum relative refractive index difference of the core portion is lower than 0.4%, only a small rise is achieved for the threshold value to cause the SBS. Therefore, the effects achieved are insignificant.

When an average relative refractive index difference of the core portion falls within a range from 0.30% to 0.40%, the optical fiber can satisfy the characteristics defined by International Telecommunication Union Telecommunication Standardization Section (ITU-T) G.652, with it being possible to achieve a high threshold value to cause the SBS. Therefore, this configuration is desirable.

It is preferable that, in the core portion of the optical fiber, a part having a high refractive index and a part having a low refractive index are sufficiently distant from each other. With this configuration, the optical fiber can achieve a high threshold value to cause the SBS.

According to the present invention, a mode field diameter of the optical fiber falls within a range from 8.6 μm to 9.5 μm at 1310 nm, and a cable cutoff wavelength of the optical fiber is equal to or lower than 1260 nm. Furthermore, after the optical fiber is subjected to hydrogen aging, a loss of the optical fiber is preferably equal to or lower than 0.4 dB/km at 1383 nm. Having this configuration, the optical fiber provided can satisfy the standards defined by ITU-T G.652, and achieves a high threshold value to cause the SBS.

The present invention enables an optical fiber having a high threshold value to cause the SBS to be manufactured at low costs. Furthermore, the optical fiber has approximately the same mode field diameter (MFD) as a normal single mode optical fiber, and therefore suffers from only a small connection loss when connected to a normal single mode optical fiber. Here, the loss spectrum of the optical fiber relating to the present invention is substantially the same as that of a normal low-moisture single mode optical fiber that satisfies the characteristics defined by ITU-T G.652C, even after a hydrogen aging test is conducted on the optical fiber.

Here, all the necessary features of the present invention are not listed in the summary. The sub-combinations of the features may become the invention.

DESCRIPTION OF EXEMPLARY EMBODIMENTS

Figure 1:
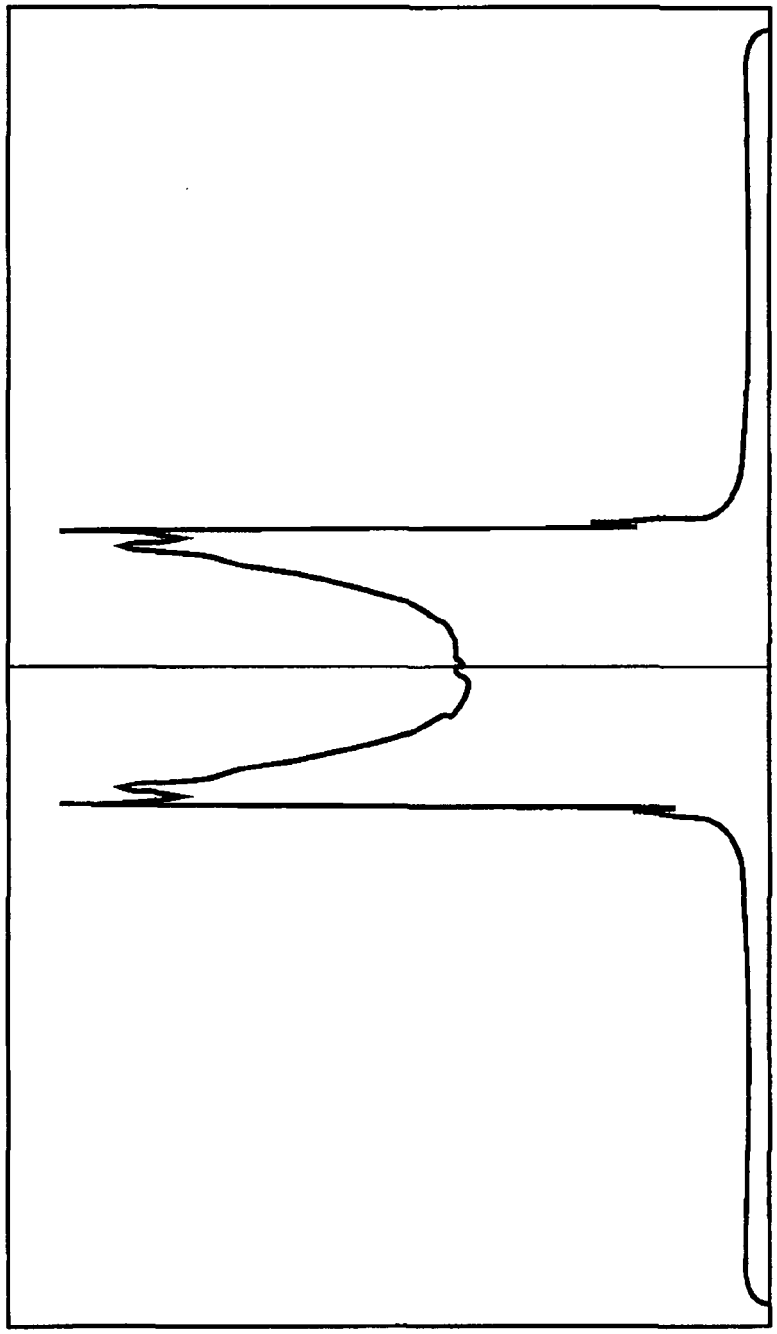
FIG. 1 is a graph showing a refractive index distribution, in the radial direction, of a core rod used to manufacture an optical fiber relating to a first embodiment of the present invention.

Hereinafter, an embodiment of the present invention will be described. The embodiment does not limit the invention according to the claims, and all the combinations of the features described in the embodiment are not necessarily essential to means provided by aspects of the invention.

As mentioned earlier, the threshold value (mW) to cause the SBS is proportional to the value of $A_e$. By simply increasing the value of $A_e$, the SBS threshold value can be raised accordingly. However, when the value of $A_e$ is increased for a signal mode optical fiber having a normal rectangular profile for the refractive index distribution, for example, the mode field diameter (MFD) increases. Therefore, due to MFD mismatch, the optical fiber suffers from a larger loss at a point where the optical fiber is connected to a different optical fiber. For this reason, the SBS threshold value may be raised, but the increase in loss needs to be compensated for by inputting a higher optical energy. As a consequence, the optical fiber can not satisfy the requirements relating to signal transmission.

To solve this problem, many efforts have been made. As a result of such efforts, it has been found that, when the following shape (hereinafter referred to as the refractive index profile) is obtained for the refractive index distribution, the value of $A_e$ can be independently increased with it being possible to maintain the parameters such as the MFD and cutoff wavelength at values complying with the ITU-T G.652, which is an international standard for a normal single mode optical fiber.

Specifically speaking, a desirable optical fiber has such a refractive index profile that the refractive index increases from the center of the core portion towards the external surface. Here, the relative refractive index difference of the center of the core portion falls within the range of 0.15% to 0.30%, and the maximum relative refractive index difference of the core portion falls within the range of 0.4% to 0.6%. More particularly, it has been found even easier for the optical fiber to satisfy the standards defined by ITU-T G.652 when the refractive index distribution of the core portion is adjusted so that the average value calculated based on the maximum and minimum values of the relative refractive index difference of the core portion falls within the range of 0.30% to 0.40%.

The optical fiber having the above-described features may be used in an application utilizing many signal wavelength bands due to wavelength division multiplexing (WDM).

Here, the signal wavelength bands utilized may include a wavelength band in the vicinity of the wavelength of 1383 nm at which the absorption loss caused by OH groups peaks. When a large absorption loss is caused by the OH groups at the peak wavelength, the loss at the wavelength band including, for example, the wavelength of 1550 nm is increased. Such an increase may resultantly require a higher optical energy to be input into the optical fiber. Therefore, taking into consideration that the optical fiber is used for the above use, the optical fiber can preferably maintain a low loss of equal to or lower than 0.40 dB/km at the wavelength of 1383 nm even after a hydrogen aging test is conducted on the optical fiber to simulate an increase in loss during the lifetime of the optical fiber.

An exemplary method to prevent the optical fiber from being affected by hydrogen aging is as follows. The optical fiber is exposed to an atmosphere containing therein deuterium for a predetermined period of time after the drawing step. The exposure to deuterium can inactivate in advance active defects which may cause an increase in loss due to hydrogen.

In the following, the present invention is described in more detail based on an exemplary embodiment and a comparison example. However, the present invention is not limited to the following examples, and can provide a variety of different embodiments.

EMBODIMENT

First Embodiment

A core rod including therein a core and a clad is manufactured by means of the vapor phase axial deposition (MAD) method. The manufactured core rod has the refractive index profile shown in FIG. 1. As shown in FIG. 1, the refractive index distribution of the core rod has a unique profile in which the refractive index increases in a substantially continuous manner from the vicinity of the center towards the external surface and symmetrical peaks are formed at positions substantially corresponding to the external periphery of the core. Outside the peaks in the refractive index profile, the refractive index radically drops. Therefore, the portions in the refractive index profile outside the peaks correspond to the clad. Here, when an optical fiber having a diameter of 125 μm is manufactured from the above-mentioned core rod, the core of the manufactured optical fiber has an effective diameter of 8.3 μm.

The core rod is manufactured by performing deposition with the use of one burner for the core and two burners for the clad. The refractive index profile characterizing the present invention is obtained by adjusting the conditions relating to the gases used by the burners and the conditions relating to the setting of the burners. The burner for the core is supplied with, as a gaseous material, $SiCl_4$ and, as a dopant, $GeCl_4$. The burners for the clad are supplied with $SiCl_4$ along with oxygen and hydrogen which are to create a flame. On the external surface of the core rod, a necessary clad is additionally formed by means of the outside vapor deposition (OVD) method. In this manner, a preform for an optical fiber is manufactured.

Here, the relative refractive index difference of the center of the core of the preform is 0.23% and the maximum e relative refractive index difference of the core is 0.5%.

Figure 2:
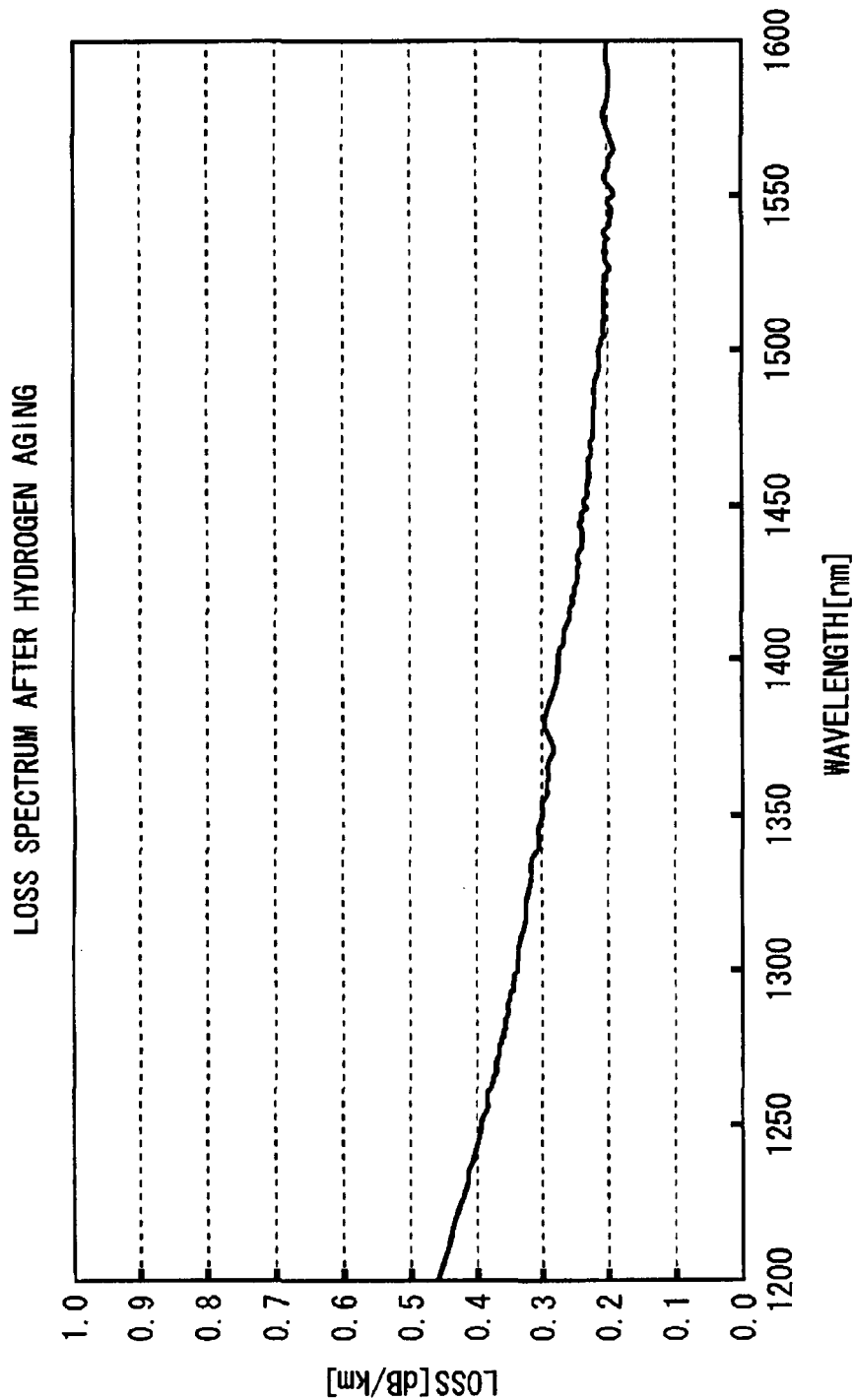
FIG. 2 is a graph showing a loss of the optical fiber relating to the first embodiment, which is observed after the optical fiber is subjected to hydrogen aging.
Figure 3:
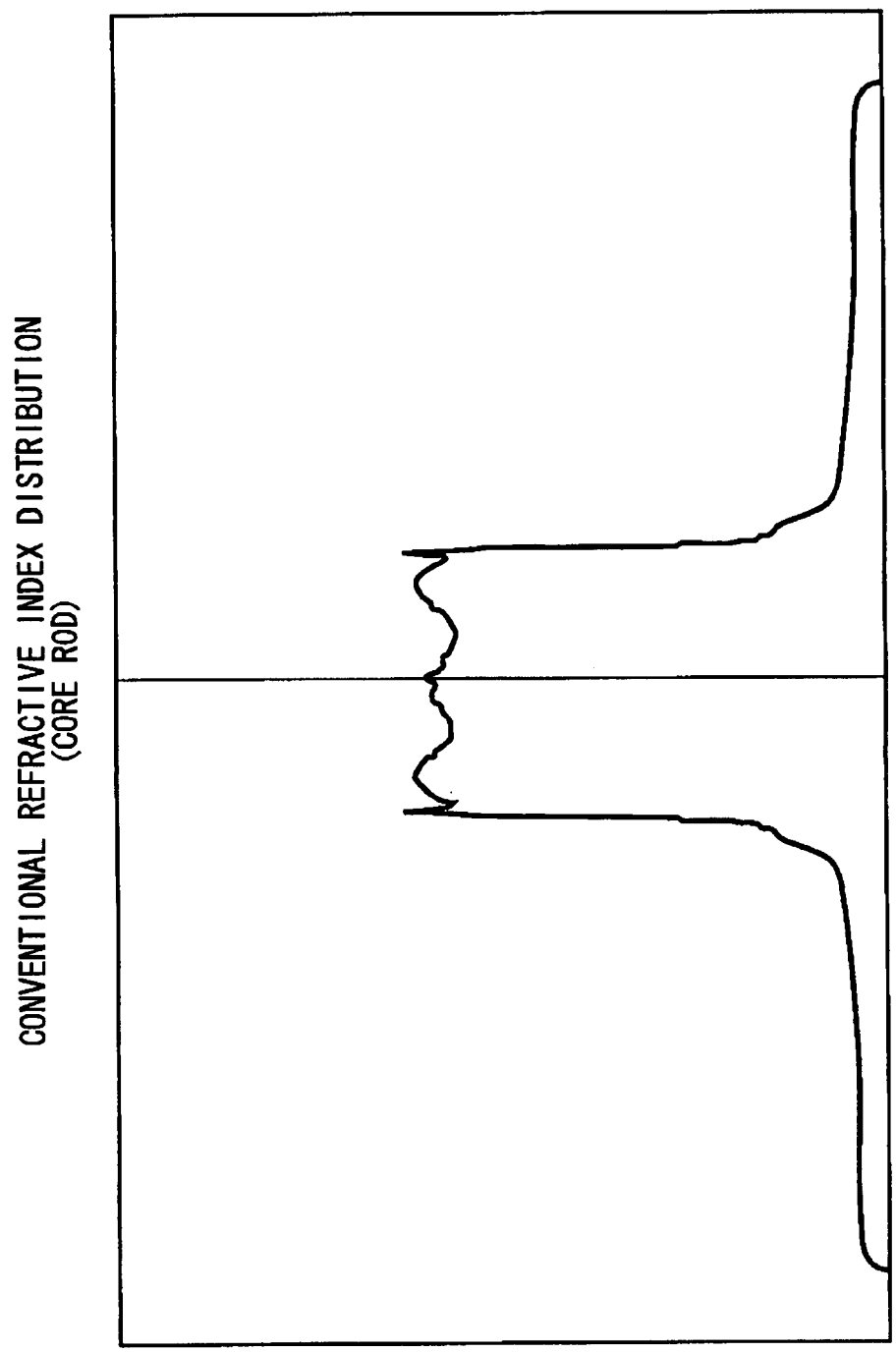
FIG. 3 is a graph showing a refractive index distribution, in the radial direction, of a core rod used to manufacture a conventional optical fiber.

By drawing the preform, an optical fiber is obtained. The obtained optical fiber has an MFD of 9.3 μm and a cable cutoff wavelength of 1220 nm. After exposed to an atmosphere containing therein 1% of deuterium for three days, the optical fiber is subjected to a hydrogen aging test. The loss spectral characteristics of the optical fiber is shown in FIG. 2, and substantially the same as those of a normal low-moisture single mode optical fiber that satisfies the standards defined by ITU-T G.652C, even after the hydrogen aging test.

The value of $A_e$ of the optical fiber is 90 μm$^2$, and fairly larger than the value of $A_e$ (82 μm$^2$) of a single mode optical fiber which has a rectangular profile and the same characteristics as the optical fiber. The SBS threshold value of the optical fiber at the wavelength of 1550 nm is higher by approximately 3 dB. The reason for this increase may be explained as follows. In addition to the increase achieved by the increase in the value of $A_e$, the density of germanium, which is included in the dopant to form the refractive index distribution of the core portion, is significantly varied in the radial direction, and this secondarily achieves effects of broadening the spectrum of the scattered light, thereby contributing to the increase in the SBS threshold value.

The MFD of this optical fiber is similar to the MFD of a normal single mode optical fiber. Therefore, even when this optical fiber is connected to a normal single mode optical fiber, the connection loss is kept low, similarly to a case where normal single mode optical fibers are connected to each other.

Figure 4:
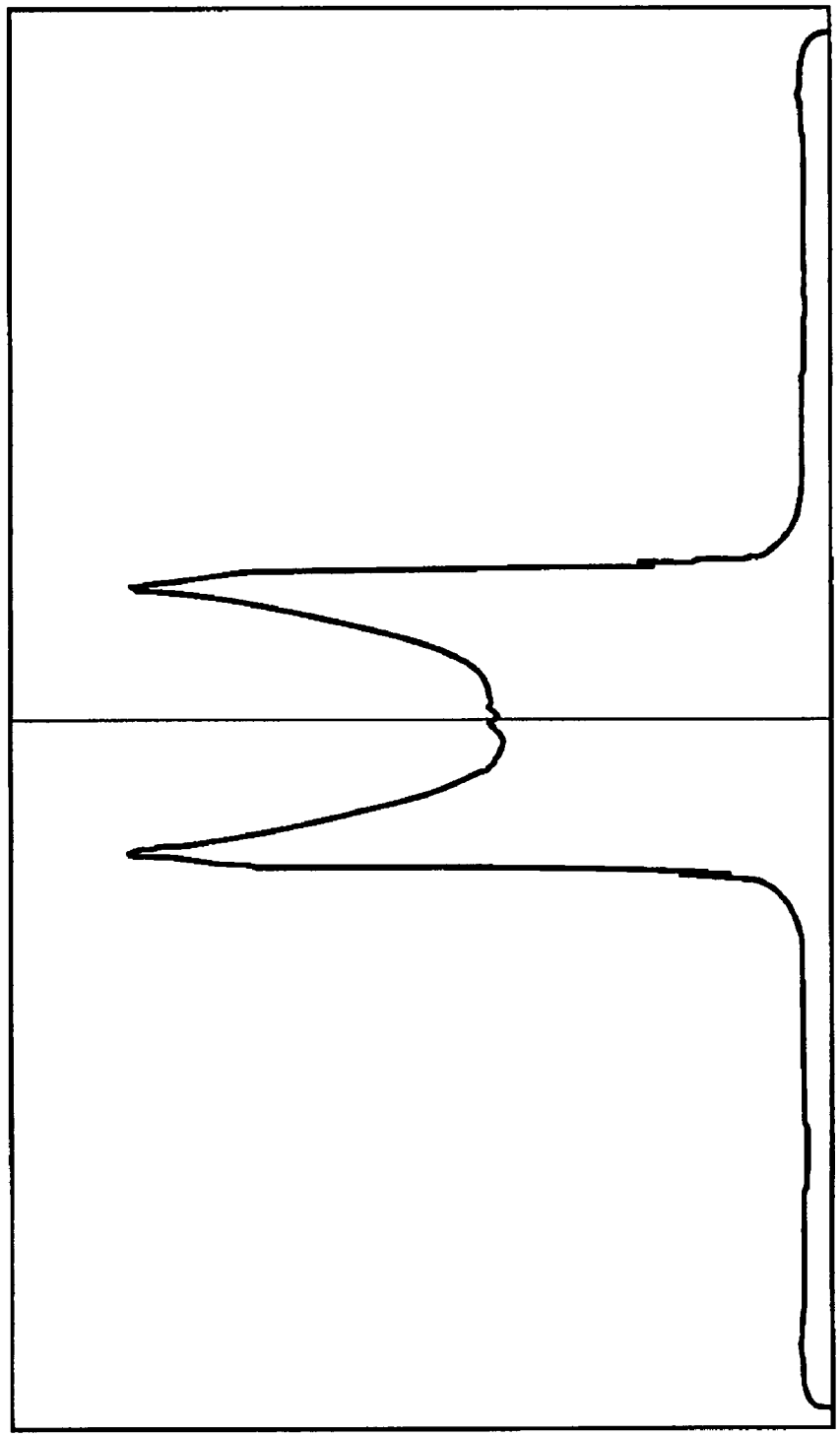
FIG. 4 is a graph showing a different refractive index distribution, in the radial direction, of another core rod which also can be used to manufacture the optical fiber relating to the first embodiment of the present invention.

Note that FIG. 4 shows a refractive index distribution according to which the core portion has the maximum refractive index in a position which is not positioned at the outmost part of the core portion. When an optical fiber is manufactured by using the core rod having the refractive index distribution shown in FIG. 4, the manufactured optical fiber also realizes the effects of enhancing the SBS threshold value. Furthermore, as can be seen by comparing FIGS. 1 and 4, an optical fiber, which is manufactured by using the core rod having a refractive index distribution in which the refractive index peaks at a plurality of wavelengths, can also realize the effects of enhancing the SBS threshold value. Note that, however, it is more advantageous in improving the SBS threshold value that the high refractive index part and the low refractive index part are sufficiently distant from each other.

While the embodiment of the present invention has been described, the technical scope of the invention is not limited to the above described embodiment It is apparent to persons skilled in the art that various alternations and improvements can be added to the above-described embodiment It is also apparent from the scope of the claims that the embodiments added with such alternations or improvements can be included in the technical scope of the invention.

The present invention makes it possible to manufacture an optical fiber having a high threshold value to cause the SBS at low costs, and to achieve a further longer distance between relay points for transmission.

What is claimed is:

1. An optical fiber comprising a clad portion and a core portion surrounded by the clad portion, the clad portion being formed by substantially pure quartz, the core portion having a higher refractive index than the clad portion, wherein a relative refractive index difference of a center of the core portion falls within a range from 0.15% to 0.30% and a maximum relative refractive index difference of the core portion falls within a range from 0.4% to 0.6%, and wherein the optical fiber comprises a refractive index profile such that a refractive index increases one of substantially constantly and substantially monotonically throughout the core portion from the center of the core portion towards an external surface of the optical fiber.

2. The optical fiber as set forth in claim 1, wherein in the core portion, a part having a high refractive index and a part having a low refractive index are sufficiently distant from each other.

3. The optical fiber as set forth in claim 1, wherein an average relative refractive index difference of the core portion falls within a range from 0.30% to 0.40%.

4. The optical fiber as set forth in claim 1, wherein a mode field diameter of the optical fiber falls within a range from 8.6 μm to 9.5 μm at 1310 nm, and a cable cutoff wavelength of the optical fiber is equal to or lower than 1260 nm.

5. The optical fiber as set forth in claim 1, wherein a loss of the optical fiber is equal to or lower than 0.4 dB/km at 1383 nm after the optical fiber is subjected to hydrogen aging.

6. The optical fiber set forth in claim 1, wherein the refractive index peaks at an external periphery of the core portion.

7. The optical fiber set forth in claim 6, wherein the refractive index falls outside of the external periphery of the core portion.

8. The optical fiber set forth in claim 6, wherein a refractive index of the clad portion is lower than the refractive index at the external periphery of the core portion.

9. A method of making an optical fiber, comprising:

forming a core portion surrounded by a clad portion, the clad portion being formed by substantially pure quartz, the core portion having a higher refractive index than the clad portion, wherein a relative refractive index difference of a center of the core portion falls within a range from 0.15% to 0.30% and a maximum relative refractive index difference of the core portion falls within a range from 0.4% to 0.6%, and wherein the optical fiber comprises a refractive index profile such that a refractive index increases one of substantially constantly and substantially monotonically throughout the core portion from the center of the core portion towards an external surface of the optical fiber.

10. The method according to claim 9, further comprising using vapor phase axial deposition method to form the core portion and the clad portion.

11. The method according to claim 9, wherein in the core portion, a part having a high refractive index and a part having a low refractive index are sufficiently distant from each other.

12. The method according to claim 9, wherein an average relative refractive index difference of the core portion falls within a range from 0.30% to 0.40%.

13. The method according to claim 9, wherein a mode field diameter of the optical fiber falls within a range from 8.6 μm to 9.5 μm at 1310 nm, and a cable cutoff wavelength of the optical fiber is equal to or lower than 1260 nm.

14. The method according to claim 9, wherein a loss of the optical fiber is equal to or lower than 0.4 dB/km at 1383 nm after the optical fiber is subjected to hydrogen aging.

15. The method according to claim 9, wherein the refractive index peaks at an external periphery of the core portion.

16. The method according to claim 15, wherein the refractive index falls outside of the external periphery of the core portion.

17. The method according to claim 15, wherein a refractive index of the clad portion is lower than the refractive index at the external periphery of the core portion.

* * * * *